Figure 1:
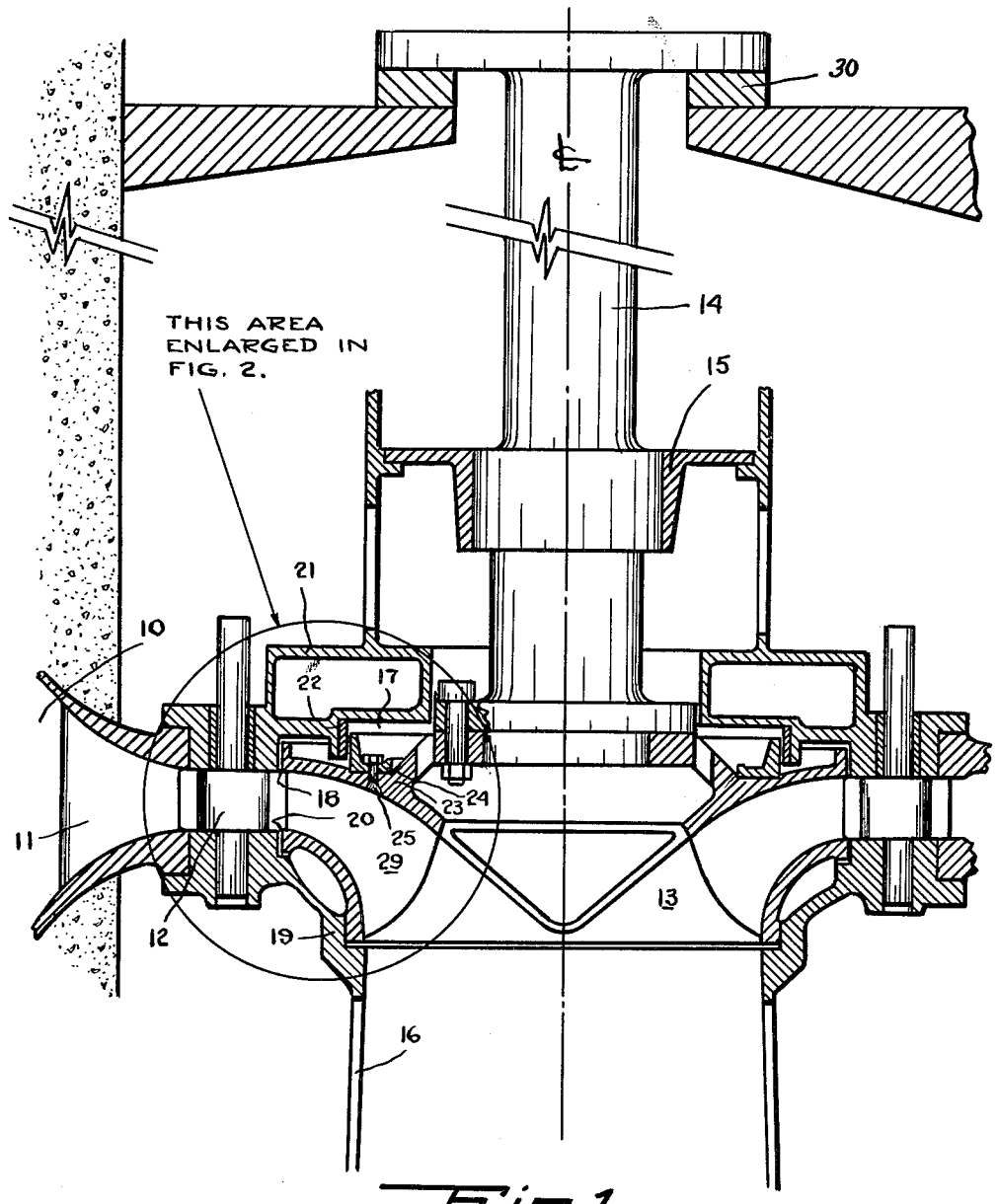

Nov. 30, 1965   V. G. M. CHATFIELD ETAL   3,220,696
DETACHABLE SEAL FOR HYDRAULIC MACHINES
Filed Sept. 18, 1963   2 Sheets-Sheet 1

INVENTORS
VICTOR G. M. CHATFIELD
ROBERT A. NEWEY
BY
ATTORNEY.

INVENTORS.
VICTOR G. M. CHATFIELD
ROBERT A. NEWEY

ATTORNEY.

United States Patent Office 3,220,696
Patented Nov. 30, 1965

3,220,696
DETACHABLE SEAL FOR HYDRAULIC MACHINES
Victor G. M. Chatfield, Lachine, Quebec, and Robert A. Newey, Pointe Claire, Quebec, Canada, assignors to Dominion Engineering Works Limited
Filed Sept. 18, 1963, Ser. No. 309,751
2 Claims. (Cl. 253—26)

This invention relates to mixed flow hydraulic machines including turbines, pumps and pump-turbines of the type which are characterized by the provision of seals for the reduction of leakage water between the stationary structure and the runner crown and has particular reference to providing a rotating crown seal element which is detachable.

In Francis type hydraulic machines, the axis of rotation of the runner or rotor is subject to transient lateral displacements. The magnitude of these displacements is usually accommodated by allowing a sufficiently large radial clearance between the rotating and stationary sealing elements consistent with a reasonable leakage rate. However, it has been found that if the rotor is subjected to dynamic unbalance for any reason, a log becoming jammed between the vanes for example, this causes a displacement which is beyond the normal radial clearance provided by the seals. In this condition, the unbalance may be such that an area of the periphery of the rotating crown seal is forced into contact with the bore of the stationary crown seal ring, causing sufficient friction to gall and finally seize the rotor in the headcover.

In the past, mishaps of this nature have been of such severity that normal methods of freeing this seizure have proved impossible and have necessitated scrapping the rotor. The rotor is the most expensive single component in a hydraulic machine.

Conventional methods of repairing or replacing crown seals involve dismantling a high proportion of the machine including withdrawing the rotor from its operating position; this is time consuming and expensive.

It will be appreciated that the foregoing description of the rotor seizing in the headcover is the result of an abnormal condition; however, we have invented means whereby should this condition occur the damage caused will be minimized. It will be less costly to repair and the machine will be out of service for a shorter period of time.

The principal object of the present invention is to provide a Francis type runner or rotor with a crown seal element which is capable of being detached therefrom should the rotor seize in the headcover, without the necessity of removing the rotor from its working position.

Another object of this invention is to provide a Francis type rotor with a crown seal element which is readily removable therefrom, so that a change in the thrust characteristics of the rotor may be implemented by substituting rotating crown seal elements of differing diameters in conjunction with modified stationary crown seal elements.

Another object of this invention is to provide a Francis type rotor with a crown seal element which is readily therefrom, utilizing attachment bolts which are of a different magnetic property than that of the rotor and seal element.

Other objects and advantages will be apparent from the foregoing description taken in connection with the accompanying drawings. It will be understood that changes may be made in the details of construction and arrangement of parts shown and described, as the preferred form of the invention has been given by way of illustration only.

Figure 2:
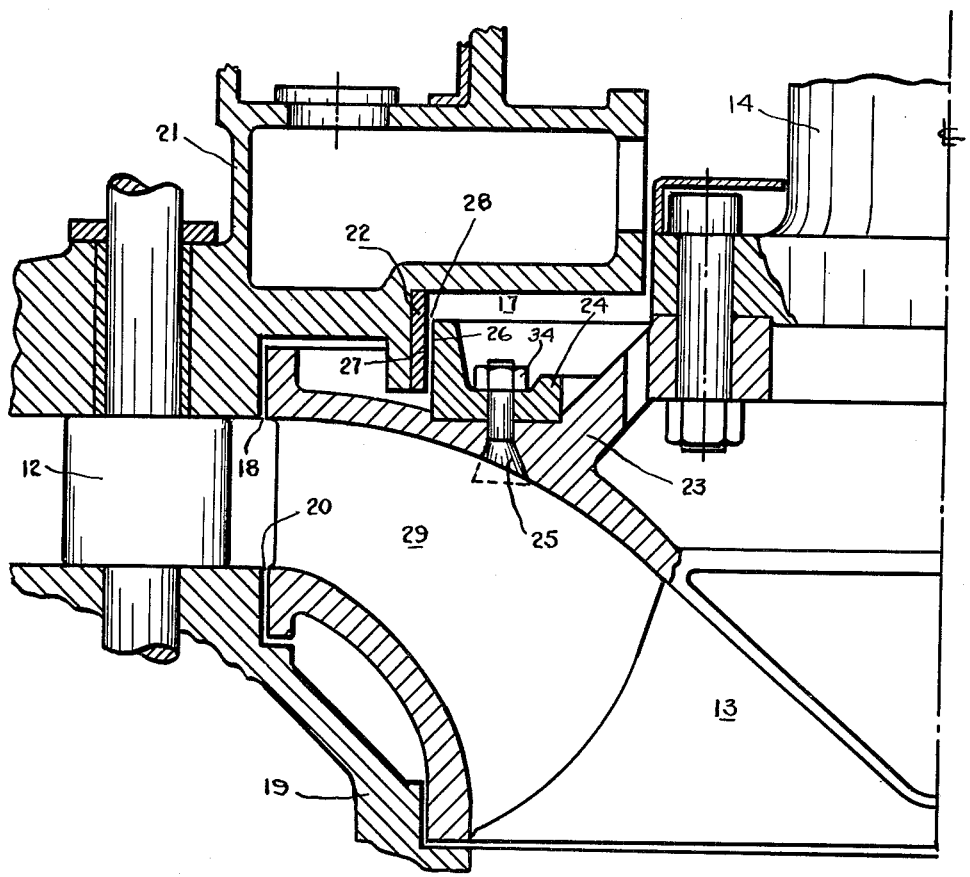

Referring to the drawings:
FIG. 1 is a vertical diametral sectional view of a Francis turbine or pump-turbine and;
FIG. 2 is a fragmentary vertical radial sectional view of that portion of FIG. 1 shown encircled.

Referring more particularly to the drawings wherein similar reference characters designate corresponding parts throughout, with particular reference to FIG. 1, water from inlet casing 10 is directed by stay vanes 11 and wicket gates 12 to the rotor shown generally at 13 and is discharged by way of draft tube 16. Rotor 13 is bolted to shaft 14; shaft 14 is journalled in guide bearing 15. A crown seal, shown generally at 17 is provided to reduce leakage water which escapes through radial clearance 18. Similarly a band seal, shown generally at 19 is provided to reduce leakage water which escapes through radial clearance 20. It is to crown seal 17 that this invention applies.

With reference to FIG. 2, which shows details of the preferred execution of the invention, headcover 21 is provided with stationary crown seal ring 22. Crown 23 of rotor 13 is provided with crown extension 24 which is attached thereto by means of bolts 25. Vertical face 26 of extension 24 cooperates with bore 27 of seal ring 22 to form a seal which reduces leakage water through radial clearance 28. The dimension of clearance 28 is dictated by the normal transient displacements to which rotor 13 is subjected.

Rotor 13 and extension 24, in this execution are of austenitic non-magnetic stainless steel containing about 18% chromium and 8% nickel. Bolts 25 are of a ferritic stainless steel containing about 13% chromium exhibiting similar properties of hardness and corrosion or cavitation resistance; they are also in the same location of the galvanic series as rotor 13 and extension 24 to prevent galvanic corrosion.

As has been described above, should extension 24 seize in bore 27, the heads of bolts 25, which have been ground or otherwise machined to conform to the contour of water passages shown generally at 29, are located by means of "Magnaflux" or other suitable detection equipment. The heads are then chipped or burned off, which allows headcover 21, usually constructed in halves, to be raised by suitable means with seized extension 24, until it is possible to chip or otherwise remove said extension. When this has been done rotor 13 may then be disconnected from shaft 14 and fitted with a new extension 24.

When the machine is in service it may become apparent that the action of rotor 13 is such that it produces either excessive down thrust, thereby overloading generator bearing 30 or too much up thrust which tends to lift the rotating assembly off bearing 30. To correct these conditions, it is necessary to alter the hydraulic thrust characteristics of rotor 13. In conventional machines this is accomplished by decreasing or increasing the diameter and bore of both seal elements while still maintaining clearance 28 at optimum value. However, as the rotating element of seal 17 is normally an integral component of the structure of rotor 13, it will be appreciated that any alteration to this diameter requires complete removal of the rotor with subsequent extensive remachining.

By utilizing detachable extensions 24 of the desired diameter, it will be seen that the thrust characteristics of rotor 13 may be readily altered, thus circumventing the majority of the difficulties described above which apply to conventional hydraulic machines.

It will be seen from the foregoing that we have provided new and improved means for accomplishing all of the objects and advantages of the invention.

We claim:

1. In a rotary mixed flow hydraulic machine comprising a non-magnetic stainless steel runner having a band shroud and a crown shroud forming a water passage, a plurality of blades extending between said shrouds in the water passage, a stationary member including a head cover surrounding the crown shroud, a seal ring on said head cover having a diameter less than the diameter of the runner tip, an extension mounted on said crown shroud having a face spaced from the bore of the seal ring to provide a clearance and cooperating therewith to form a sealing means, means comprising bolts of ferritic stainless steel capable of magnetization, extending through the crown shroud from within the water passage of the runner to secure the extension thereto, said bolts being held in place by nuts tightened against the extension and being releasable from within the water passage upon removal of the bolt heads thereby permitting removal of the extension with the head cover in the event of seizing of the sealing means.

2. In a rotary mixed flow hydraulic machine comprising a runner having a band shroud and a crown shroud forming a water passage, a plurality of blades extending between said shrouds in the water passage, a stationary member including a head cover surrounding the crown shroud, a seal ring on said head cover having a diameter less than the diameter of the runner tip, an extension mounted on said crown shroud having a face spaced from the bore of the seal ring to provide a clearance and cooperating therewith to form a sealing means, fastening means such as bolts extending from the water passage through the crown shroud to secure the extension thereto, said fastening means having a detectable characteristic such as a physical property to afford ready distinction from the material of the crown shroud, whereby, on need arising to release the extension from the runner to permit dis-assembly of the machine, said fastening means may be readily located from within said runner to permit release of said fastening means from securing relation with the runner.

References Cited by the Examiner

UNITED STATES PATENTS

| | | | |
|---|---|---|---|
| 807,971 | 12/1905 | Skinner | 103—114 |
| 1,180,602 | 4/1916 | Pfau | 253—117 |
| 1,525,884 | 2/1925 | Plummer. | |
| 2,007,954 | 7/1935 | Carlson | 103—114 |
| 2,703,922 | 3/1955 | Brauchler et al. | 103—112 |

FOREIGN PATENTS

| | | |
|---|---|---|
| 164,654 | 8/1955 | Australia. |
| 318,601 | 7/1902 | France. |
| 802,529 | 6/1936 | France. |
| 2,802 | 1907 | Great Britain. |

DONLEY J. STOCKING, *Primary Examiner.*

HENRY F. RADUAZO, KARL J. ALBRECHT,
*Examiners.*